(12) United States Patent
Eusterwiemann (10) Patent No.: US 11,167,339 B2
(45) Date of Patent: Nov. 9, 2021

(54) METHOD FOR FILLING A RIVET CARTRIDGE WITH RIVET ELEMENTS

(71) Applicant: Broetje-Automation GmbH, Rastede (DE)

(72) Inventor: Christoph Eusterwiemann, Oldenburg (DE)

(*) Notice: Subject to any disclaimer, the term of this patent is extended or adjusted under 35 U.S.C. 154(b) by 31 days.

(21) Appl. No.: 16/301,155

(22) PCT Filed: May 12, 2017

(86) PCT No.: PCT/EP2017/061482
§ 371 (c)(1),
(2) Date: Nov. 13, 2018

(87) PCT Pub. No.: WO2017/194749
PCT Pub. Date: Nov. 16, 2017

(65) Prior Publication Data
US 2019/0291171 A1 Sep. 26, 2019

(30) Foreign Application Priority Data
May 13, 2016 (DE) ............... 10 2016 108 875.7

(51) Int. Cl.
*B21J 15/32* (2006.01)
*B21J 15/28* (2006.01)
*B23P 19/00* (2006.01)

(52) U.S. Cl.
CPC .............. *B21J 15/32* (2013.01); *B21J 15/28* (2013.01); *B23P 19/001* (2013.01); *B07C 2501/0009* (2013.01)

(58) Field of Classification Search
CPC .......... B21J 15/32; B21J 15/28; B23P 19/001; B07C 2501/0009
See application file for complete search history.

(56) References Cited

U.S. PATENT DOCUMENTS 4,828,159 A 5/1989 Woods
5,011,339 A 4/1991 Aurtoi et al.
(Continued)

FOREIGN PATENT DOCUMENTS

CN 101402088 4/2009
CN 102266902 12/2011
(Continued)

OTHER PUBLICATIONS

Non-Final Office Action for U.S. Appl. No. 16/099,018 dated Mar. 12, 2020 (18 pages).
(Continued)

*Primary Examiner* — Rick K Chang
(74) *Attorney, Agent, or Firm* — Pauly, DeVries Smith & Deffner LLC (57) ABSTRACT

A method is provided for filling a rivet cartridge with rivet elements by means of a rivet loading station having a rivet delivery unit for delivering the rivet elements and having a rivet cartridge receiving means for receiving a rivet cartridge. The rivet elements are supplied from the rivet delivery unit to a rivet cartridge which is received in the rivet cartridge receiving means and are received therein in an aligned manner. The rivet loading station detects pre-determined characteristics of the rivet elements that are relevant to the drilling process and/or the riveting process prior to supplying them to the rivet cartridge.

18 Claims, 3 Drawing Sheets

(56) References Cited

U.S. PATENT DOCUMENTS

| | | | |
|---|---|---|---|
| 5,014,894 A | 5/1991 | Smart | |
| 5,150,623 A | 9/1992 | Woods et al. | |
| 5,727,300 A * | 3/1998 | Ekdahl | B21J 15/10 |
| | | | 29/407.04 |
| 7,882,981 B2 | 2/2011 | Auriol et al. | |
| 8,006,362 B2 | 8/2011 | Sarh | |
| 8,721,252 B2 | 5/2014 | Osada et al. | |
| 11,033,951 B2 | 6/2021 | Eusterwiemann | |
| 2008/0244888 A1 | 10/2008 | Sarh | |
| 2011/0018291 A1 | 1/2011 | Osada et al. | |
| 2017/0056960 A1 | 3/2017 | Ficken et al. | |
| 2017/0151643 A1 | 6/2017 | Ficken et al. | |
| 2019/0134701 A1 | 5/2019 | Eusterwiemann | |

FOREIGN PATENT DOCUMENTS

| | | |
|---|---|---|
| CN | 102829726 | 12/2012 |
| CN | 104668427 | 6/2015 |
| DE | 102008056246 | 5/2010 |
| DE | 202008014886 | 5/2010 |
| DE | 102009040764 | 3/2011 |
| DE | 102011113832 | 3/2013 |
| DE | 102012020981 | 5/2013 |
| DE | 102014106312 | 11/2015 |
| EP | 2253415 | 11/2010 |
| GB | 2147841 | 5/1985 |
| JP | S60123231 | 8/1985 |
| SU | 347096 | 9/1972 |
| SU | 1660828 | 7/1991 |
| WO | 2010052602 | 5/2010 |
| WO | 2015169727 | 11/2015 |
| WO | 2017103391 | 6/2017 |
| WO | 2017194749 | 11/2017 |
| WO | 2017194760 | 11/2017 |

OTHER PUBLICATIONS

Chinese Search Report for Chinese Patent Application No. 201780029668.0 dated Jun. 4, 2020 (2 pages) English Translation Only.

"German Search Report," for Priority Application No. 102016108875.7 dated Jan. 26, 2017 (7 pages).

"German Search Report," for Priority Application No. DE102016108874.9 dated Jan. 26, 2017 (9 pages).

"International Search Report and Written Opinion," for PCT Application No. PCT/EP2017/061482 dated Aug. 22, 2017 (12 pages).

"International Search Report and Written Opinion," for PCT Application No. PCT/EP2017061513 dated Jul. 17, 2017 (15 pages).

Chinese Search Report for Chinese Patent Application No. 201780029668.0 dated Aug. 23, 2019 (3 pages).

Chinese Search Report for Chinese Patent Application No. 201780029716.6 dated Sep. 9, 2019 (3 pages).

Final Office Action for U.S. Appl. No. 16/099,018 dated Oct. 9, 2020 (14 pages).

Response to Non-Final Rejection dated Mar. 12, 2020 for U.S. Appl. No. 16/099,018, submitted via EFS-Web on Aug. 12, 2020, 9 pages.

"Notice of Allowance," for U.S. Appl. No. 16/099,018 dated Mar. 23, 2021 (12 pages).

"Response to Final Rejection," dated Oct. 9, 2020 for U.S. Appl. No. 16/099,018, submitted via EFS-Web on Mar. 9, 2021, 9 pages.

* cited by examiner

METHOD FOR FILLING A RIVET CARTRIDGE WITH RIVET ELEMENTS

CROSS-REFERENCE TO RELATED APPLICATIONS

This application is a national stage application under 35 U.S.C. 371 of International Patent Application Serial No. PCT/EP2017/061482, entitled "Method for Filling a Rivet Cartridge with Rivet Elements," filed May 12, 2017, which claims priority from German Patent Application No. DE 10 2016 108 875.7, filed May 13, 2016, the disclosure of which is incorporated herein by reference.

FIELD OF THE TECHNOLOGY

The disclosure relates to a method for filling a rivet cartridge with rivet elements, to a method for producing a structural component and to a rivet loading station.

BACKGROUND

When producing structural components, large numbers of rivet joints have to be regularly produced. The production of said rivet joint is increasingly effected in an automated manner by riveting machines. As a rule, said riveting machines are also supplied in an automated manner with rivets from rivet storage units, so-called racks. Multiple rivet cartridges with the rivet elements are received, as a rule, in said racks.

The rivet joint is subject to very demanding quality requirements. In particular, in this case, it is necessary to avoid rivet head protrusions or damage to the components caused by the riveting operation. These and other faults can occur, in particular, when the dimensions of the rivet element do not fit the bore into which it is to be inserted.

In order to be able to be judge even before the rivet joint is produced whether a rivet to be used is suitable as regards its tolerances and its batch deviations to be placed into a bore which also has tolerances, the bore and in particular the diameter of its counterbore are measured. As a result of comparing the bore with the rivet, it is then possible to make a decision as to whether a specific rivet can be used for said specific bore.

In particular, rivet producers measure rivet elements from a production cycle, the so-called batch, on a random basis and decide statistically on the tolerance ranges of such a batch. Said batch data is also printed in part on a packaging. This enables a certain amount of batch-specific adjustment between the drilling process and the rivets to be affixed. As a result, it is possible to achieve improvement in the riveting process. Nonetheless, said tolerance ranges are in part too large in order to avoid, in a reliable manner, the afore-described faults when producing a bore rivet joint.

International patent application WO 2015/169727 consequently proposes measuring the rivet elements along the transport section in the direction of a rivet machine for determining a rivet geometry of the rivet.

SUMMARY

A disadvantage here is that it is not ascertained whether or not the rivet element fits the bore until it is on the way to the rivet head or it cannot be ascertained until said point whether or not the rivet is possibly faulty and is not able to be used. In addition, at this point the rivet element can no longer be assigned, as a rule, to a specific batch and/or to a specific producer such that a complaint regarding the same is not possible.

Consequently, it is an object of the disclosure to provide a method or a rivet loading station which enable early and comprehensive testing of the rivet elements.

Said object is achieved with a method as described herein.

By the rivet loading station detecting pre-determined characteristics of the rivet elements that are relevant to the drilling process and/or to the riveting process, in particular as such that are detected prior to the rivet cartridge being supplied, early and comprehensive testing of the rivet elements is made possible.

As the rivet elements to be arranged in the rivet cartridges can also be assigned to the secondary packaging in which they were supplied, comprehensive complaint management is possible.

In addition, the characteristics of the supplied rivet elements that are relevant to the drilling process and/or the riveting process can be assigned to the rivet cartridges to which the rivet elements are supplied. As a result, bores for rivet elements received in the rivet cartridges can already be carried out before said rivet elements are transported to the rivet head of a production facility.

Various characteristics that are relevant, where applicable, to the drilling process and/or riveting process are named herein.

Various embodiments are concerned with a design of a testing unit for the at least partial detecting of the pre-determined characteristics of the rivet elements that are relevant to the drilling process and/or the riveting process.

An embodiment proposes that multiple rivet cartridge receiving means with multiple rivet cartridges are provided and that in dependence on the detected characteristics of a rivet element, said rivet element is supplied to a rivet cartridge. As a result, it is possible to sort the rivet elements in dependence on the detected characteristics.

The further developments of the method according to some embodiments enable complaint management for faulty rivet elements.

Furthermore, the object described above is achieved with a method as described herein.

The identical advantages are achieved with the method for producing a structural component as described beforehand in conjunction with the method for filling a rivet cartridge.

An advantageous further development of the method is described herein. This enables high quality when producing the rivet joint.

An object described above can be achieved as a device by a rivet loading station as described herein.

The device can comprise all the features described in conjunction with the method on their own or in combination. The same advantages are produced as described in connection with the method.

Various embodiments provide a method for filling a rivet cartridge with rivet elements by means of a rivet loading station having a rivet delivery unit for delivering the rivet elements and having a rivet cartridge receiving means for receiving a rivet cartridge, wherein the rivet elements are supplied from the rivet delivery unit to a rivet cartridge which is received in the rivet cartridge receiving means and are received therein in an aligned manner, wherein the rivet loading station detects pre-determined characteristics of the rivet elements that are relevant to the drilling process and/or the riveting process prior to supplying them to the rivet cartridge.

In various embodiments, the rivet loading station comprises a control unit which controls the rivet loading station, such as wherein the control unit, by means of a sensor arrangement, in particular by means of a testing unit which is assigned to the sensor arrangement, detects the predetermined characteristics of the rivet elements that are relevant to the drilling process and/or the riveting process prior to supplying them to the rivet cartridge, such as wherein the predetermined characteristics that are relevant to the drilling process and/or the riveting process are geometric characteristics of the rivet elements and wherein the control unit measures said characteristics by means of a sensor arrangement, in particular by means of a testing unit which is assigned to the sensor arrangement.

In various embodiments, the predetermined characteristics that are relevant to the drilling process and/or the riveting process are a rivet head diameter $D_K$ and/or a rivet head length $L_K$ and/or an angle W of a rivet countersunk head and/or a transition radius R.

In various embodiments, the testing unit comprises a lighting unit for lighting a rivet element during the detecting of the predetermined characteristics that are relevant to the drilling process and/or the riveting process and lights a rivet element during the detecting process.

In various embodiments, the testing unit is realized as a system that is telecentric on both sides.

In various embodiments, the measuring tolerance of the testing unit is less than ±5 micrometers, such as ±3 micrometers, such as is ±2 micrometers.

In various embodiments, the control unit comprises pattern recognition for recognizing and/or measuring features on the shank of the rivet element and detects a pattern on the shank of the rivet element by means of the sensor arrangement, in particular of the testing unit, wherein the control unit detects and tests closing grooves and/or closing threads.

In various embodiments, a testing unit for testing rivet elements, in particular rivet collars, dips into the rivet elements and/or the rivet elements are pushed onto the testing unit.

In various embodiments, the method is realized in such a manner that all rivet elements supplied to a rivet cartridge have been tested for the predetermined characteristics that are relevant to the drilling process and/or the riveting process.

In various embodiments, rivet elements are supplied to the rivet delivery unit from a secondary packaging and wherein data regarding the rivet elements, in particular data regarding the rivet elements connected to the secondary packaging, is detected by the control unit, wherein the data includes the specification of the rivet elements.

In various embodiments, multiple rivet cartridge receiving means with multiple rivet cartridges are provided and wherein in dependence on the detected characteristics of a rivet element, said rivet element is supplied to a rivet cartridge, wherein rivet elements of the same type are supplied to at least two of the multiple rivet cartridges.

In various embodiments, subcategories are formed for a type of rivet elements and/or subcategories are formed on the basis of the data regarding the rivet elements, in particular the specification of the rivet elements, and wherein said subcategories have assigned thereto, in particular in each case, a rivet cartridge and wherein the rivet elements, in dependence on their test in the testing unit, are supplied corresponding to their categorization into a subcategory to the rivet cartridge assigned to said subcategory, wherein the subcategories are formed by tolerance ranges.

In various embodiments, data regarding the rivets supplied in a rivet cartridge or to be supplied to said rivet cartridge is linked, wherein the data, in particular the specification and/or the subcategory is linked.

Various embodiments provide a method to produce a structural component, in particular an aircraft structural component, wherein a rivet cartridge is filled as described herein and wherein the rivet cartridge is then inserted into a rivet storage unit of a production facility for producing a structural component, the production facility drills a hole in a structural component for generating a rivet joint, inserts a rivet element from the rivet cartridge into the hole and rivets.

In various embodiments, the production facility performs the drilling and/or the riveting or requests a suitable rivet element for a drilling procedure on the basis of the predetermined characteristics that are relevant to the drilling process and/or the riveting process which were detected prior to supplying the rivet elements to the rivet cartridge. Various embodiments provide a rivet loading station for carrying out a method as described herein.

BRIEF DESCRIPTION OF THE DRAWINGS

The disclosure is explained in more detail below by way of a drawing showing just one exemplary embodiment, in which.

DETAILED DESCRIPTION

Figure 1:
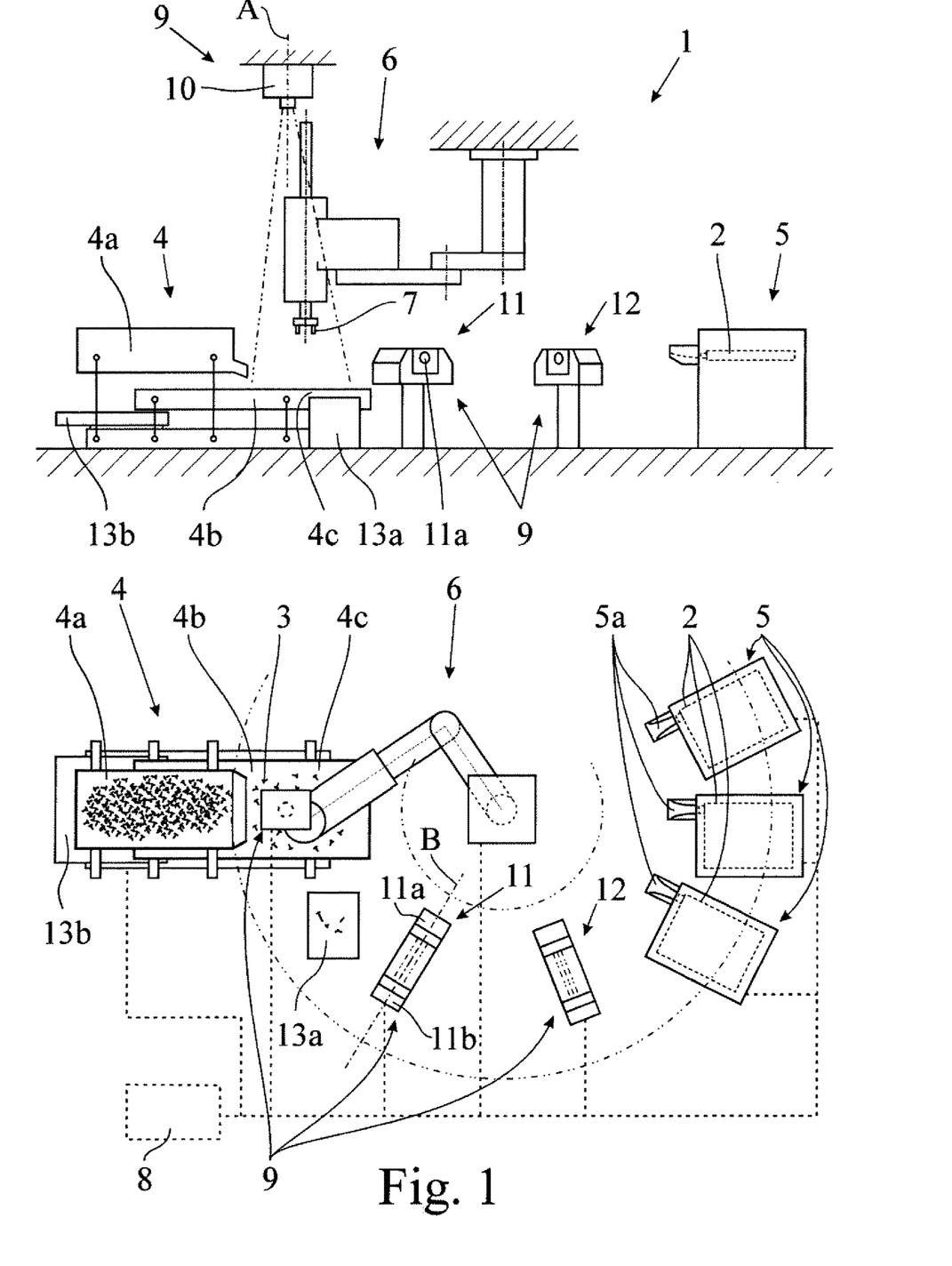
FIG. 1 shows a schematic representation of a rivet loading station as proposed for carrying out a method as proposed a) in side view, b) in top view.

FIG. 1 shows a rivet loading station 1 as proposed for filling a rivet cartridge 2 with rivet elements 3. The rivet loading station 1 comprises a rivet delivery unit 4 for delivering rivet elements 3 and a rivet cartridge receiving means 5 for receiving a rivet cartridge 2. The rivet elements 3 are supplied from the rivet delivery unit 4 to a rivet cartridge 2 received in the rivet cartridge receiving means 5 and are received therein in an aligned manner, in particular in a positionally secure manner.

At least part of the transport from the rivet delivery unit 4 to the rivet cartridge 2 can be effected in a robot-based manner. According to an embodiment, at least 50%, such as at least 80%, further at least 95% of the transports, in particular of the transport path, of the rivet elements 3 from the rivet delivery unit 4 to the rivet cartridge 2 is effected in a robot-based manner.

The robot-based transport is effected by means of a robot 6. The robot 6 here is a robot 6 with at least two rotational axes. However, the robot 6 can also comprise at least three or four or more rotational axes. In some embodiments, the robot 6 is a Skara robot or an industrial robot.

By a robot 6 removing the rivet elements 3 here from the rivet delivery unit 4 and supplying them to the rivet cartridge 2, the rivet loading station 1 is able to handle many different rivet elements 3 in a simple manner and supply them to various rivet cartridges 2.

The rivet elements 3 can be, for example, rivets 3a and/or rivet collars 3b and/or spacers. In particular, the rivet loading station 1 can comprise multiple rivet cartridge receiving means 5 for receiving rivet cartridges 2.

The rivet elements 3 are received here in various rivet cartridges 2 in dependence on a test, in particular carried out by a testing unit 11 which is to be described subsequently in more detail.

Using the rivet loading station 1, rivets of a different genus, in particular of a different type, and/or a different nominal length and/or a different nominal diameter, can be supplied to a rivet cartridge 2 or to different rivet cartridges 2 by the rivet loading station 1 without modifying the mechanical configuration of the rivet loading station 1.

In addition to this or as an alternative to it, rivet collars of a different genus, in particular of a different type, and/or a different nominal length and/or a different nominal diameter, can be supplied to a rivet cartridge 2 or to different rivet cartridges 2 by the rivet loading station 1 without modifying the mechanical configuration of the rivet loading station 1. It is therefore also possible to supply rivets and rivet collars to a rivet cartridge 2 or to different rivet cartridges 2 by the rivet loading station 1 without modifying the mechanical configuration of the rivet loading station 1.

The same applies here also to spacers. Spacers of a different genus, in particular of a different type, and/or a different nominal length and/or a different nominal diameter, can also be supplied to a rivet cartridge 2 or to different rivet cartridges 2 by the rivet loading station 1 without modifying the mechanical configuration of the rivet loading station 1.

This is achieved by using the robot 6. Said robot can grip the rivet elements 3 of the most varied design with its gripper 7, in particular a two-finger gripper, and supply them, in a secure and aligned manner, in particular in a positionally defined manner, to the rivet cartridges 2. In particular, all the rivet elements 3 supplied to a rivet cartridge can be received by the robot 6, aligned and supplied to the rivet cartridge 2. It is therefore also possible for all the rivet elements 3 to be aligned along the transport path from the rivet loading station 4 to the rivet cartridge. Their alignment does not have to be tested prior to their reception into the rivet cartridge 2 and in the event of a wrong alignment, they do not consequently have to be rotated or supplied once again to the rivet delivery unit 4.

In addition, a control unit 8 can be provided for controlling the rivet loading station 1. In this case, the control unit 8 can be realized centrally or decentrally, that is to say comprise either a central control unit or comprise multiple decentral control units. The control unit 8 controls here the rivet delivery unit 4 and the robot 6.

For delivering the rivet elements 3, the rivet delivery unit 4 can be realized as a separating-into-singles unit. The rivet elements 3 are supplied to the rivet delivery unit 4 according to a design of the method from a secondary packaging. Data regarding the rivet elements 3, in particular data regarding the rivet elements 3 linked to the secondary packaging, can be acquired by the control unit 8. In this connection, this can be, for example, the type of the rivets 3 and/or geometric required dimensions and/or batch data.

In this respect, the data regarding the rivet elements 3 can include specifications of the rivet elements 3. Acquiring can be effected, for example, by means of a barcode scanner and/or an RFID reader. Furthermore, however, manual input and/or operator selection is also possible.

Required data, in particular nominal dimensions of the rivet elements and, where applicable, batch-specific tolerance ranges, against which the rivet elements 3 can be tested, can be ascertained in this way.

The rivet delivery unit 4 comprises a storage region 4a for receiving and storing rivet elements 3. The rivet delivery unit 4 then comprises a separating-into-singles region 4b for separating the rivet 3 elements into singles and a gripping region 4c. Here, the separating-into-singles region 4b and the gripping region 4c can merge fluently into one another. The rivet elements 3 are arranged chaotically but separated-into-singles here in the gripper region 4c.

In the exemplary embodiment, for delivering the rivet elements 3 the rivet delivery unit 4 shakes, in particular as a result of wobbling movements, some rivet elements 3 out of the storage region 4a into the separating-into-singles region 4b, from where the rivet elements 3, in particular as a result of wobbling movements, are supplied, separated into singles, to the gripper region 4c. The rivet elements 3 are gripped here in the gripping region 4c in a robot-based manner, in particularly by the robot 6.

In addition, the rivet loading station 1 comprises here a sensor arrangement 9, in particular with an optical sensor 10, by means of which sensor arrangement or optical sensor the control unit 8 detects the rivet elements 3. The sensor arrangement 9 and consequently where applicable the optical sensor 10 can be also controlled here by the control unit 8.

The optical sensor 10 can be arranged above the rivet delivery unit 4, in particular the gripping region 4c. The coverage region of the optical sensor 9 can be directed to the gripping region 4c. In this case, the optical sensor 9 can be arranged in a stationary manner above the rivet delivery unit 4, in particular the gripping region 4c, however it can also be fastened on the robot 6.

A fastening above the rivet delivery unit 4 that is independent of robot movements can be provided. The rivet elements 3 can then be detected and their position and/or alignment determined parallel to the operating movements of the robot 6, in particular when the robot 6 is moved out of the coverage region of the optical sensor 10.

In order to improve the detecting of the rivet elements 3 in the gripping region 4c, at least the gripping region 4c is illuminated here from below. The gripping region can comprise a translucent bottom for this purpose.

In the exemplary embodiment, by means of the optical sensor 10, the control unit 8 detects the position and/or alignment of the rivet elements 3 in the rivet delivery unit 4, in particular in the gripping region. For gripping the rivet elements 3, the control unit 8 actuates the robot to pick up, in particular to grip, a rivet element 3 on the basis of the position and/or alignment of the rivet elements 3. The alignment is to be understood here as the orientation of the longitudinal axis of the rivet element 3 and in particular of its head 3c.

Here, by means of the sensor arrangement 9, in particular the optical sensor 10, the control unit 8 detects the genus, such as the type, of a rivet element 3 which is delivered by the rivet delivery unit 4 and lies in particular in the gripping region 4c. The type of a rivet element 3 differs in this respect from the genus thereof in that the genus determines the manner of the rivet, rivet collar and/or spacer, but is not fixed with regard to the dimensions of its features, in particular with regard to its nominal dimensions. The type of a rivet element 3 specifies not only the genus, but also the nominal dimensions of the rivet element 3, that is to say in particular the nominal diameter and the nominal length. The control unit 8 can control whether the type is a required type to be filled into a rivet cartridge 2. In this way, only such rivet elements 3 which correspond to the required type are able to be supplied to the rivet cartridge 2 or the rivet cartridges 2.

Predetermined characteristics of the rivet elements 3 that are relevant to the drilling process and/or the riveting process, in particular of the rivet elements 3 as such, are detected here prior to being supplied to the rivet cartridge 2. The predetermined characteristics of the rivet elements 3 that are relevant to the drilling process and/or the riveting process can be geometric characteristics of the rivet elements 3 and the control unit 8 measures said characteristics by means of a sensor arrangement 9, in particular by means of an optical sensor 10 which is assigned to the sensor arrangement 9 and/or a testing unit 11 which is assigned to the sensor arrangement 9. This enables, when the rivet joint is subsequently produced, matched drilling and/or riveting corresponding to the detected characteristics of the rivet element 3 and/or the selection of a rivet element 3 which is suitable for a performed drilling operation. In particular, head protrusions of a rivet element 3 beyond a predefined tolerance range can be effectively avoided in this way.

The characteristics of the rivet elements 3 that are relevant to the drilling process and/or the riveting process can be the characteristics on account of which the drilling process and/or the riveting process is adapted in a rivet element specific manner, in particular for rivet elements 3 of the same type, or the characteristics on account of which the rivet element 3 is selected for a performed bore as opposed to a rivet element 3 of the same type for the same.

Here, the characteristics that are relevant to the drilling process and/or the riveting process can be the rivet length and/or the shank diameter and/or the shank length. Said variables are detected here by the sensor arrangement 9, in particular the sensor 10 directed onto the gripping region. For detecting characteristics of the rivet elements 3 to be detected by means of the optical sensor 10, in particular the characteristics of rivet length and/or shank diameter and/or shank length, the control unit 8 carries out a transformation of the optical receiving means. This is necessary as, for example, the rivet heads of the rivet elements 3 bring about here a slight inclined position in the gripping region 4c. The measuring tolerance of said measurement can be within the range of at least 500 mµ, further of at least 200 mµ, further of at least 100 mµ.

Here, the control unit 8 tests the rivet elements 3 for damage by means of the sensor arrangement 9, in particular the optical sensor 10. It can be recognized here, for example, whether the head 3c of a rivet element 3 is missing. The detecting or testing of the rivet elements 3 by means of the sensor 10, which is directed onto the gripping region 4c, can be effected prior to the rivet elements 3 being gripped by the robot 6.

The rivet loading station 1 can comprise a testing unit 11 for detecting predetermined characteristics of the rivet elements 3 that are relevant to the drilling process and/or the riveting process. The testing unit 11 is also controlled here by the control unit 8.

Here, using the testing unit 11, a rivet head diameter $D_K$ and/or a rivet head length $L_K$ and/or an angle of a rivet countersunk head W and/or a transition radius R are measured and detected as predetermined characteristics that are relevant to the drilling process and/or the riveting process. A transition radius R is here a radius between two portions of a rivet element 3, in particular between head 3c and shank 3d of a rivet 3a. In addition, where applicable, the shank diameter $D_S$ can also be determined. Here, the measuring tolerance of the measurement with the testing unit 11 is clearly smaller, in particular smaller by at least the factor 10, than the measuring tolerance in the case of measurement with the optical sensor 10 that is directed onto the rivet delivery unit 4.

Furthermore, the measurements with the optical sensor 10 that is directed onto the rivet delivery unit 4 and with the testing unit 11 can differ in that with the optical sensor 9 that is directed onto the rivet delivery unit 4, multiple rivet elements 3 are detected at the same time and, in particular fully, whilst with the testing unit 11 only a detail of one rivet element 3 is detected.

Here, the testing unit 11 comprises an optical sensor 11a. Pre-determined characteristics that are relevant to the drilling operation and/or the riveting operation are detected with the optical sensor 11a of the testing unit 11. The control unit 8 can detect said characteristics by means of the optical sensor 11a.

The visual axis A of the optical sensor 10 directed onto the rivet delivery unit 4 and the visual axis B of the optical sensor of the testing unit 11a do not extend here parallel to one another. Further, the visual axis A of the optical sensor 9 directed to the rivet delivery unit 4 and the visual axis B of the optical sensor 11a of the testing unit 11 are substantially orthogonal to one another. In this way, a test of the rivet element 3 can be effected from two different sides and faults of a rivet element 3 that are only marked on one side can be better recognized.

In addition to this or as an alternative to it, the testing unit 11 can comprise a lighting unit 11b for measuring the predetermined characteristics that are relevant to the drilling process and/or the riveting process which illuminates the rivet element 3 during the detecting operation. The lighting unit 11b is arranged here opposite the sensor 11a of the testing unit 11. The lighting axis and the visual axis B of the optical sensor 11a, in this case, can be arranged coaxially. The viewing direction of the sensor 11 and of the lighting unit 11b are aligned here on top of one another.

In the exemplary embodiment, the testing unit 11 is realized as a system that is telecentric on both sides. This enables precise measuring without positioning the rivet element 3 precisely between the lighting unit 11b and the optical sensor 11a.

Here, the measuring tolerance with the testing unit is less than +/−5 µm, such as less than +/−3 µm, further substantially at +/−2 µm.

In addition, a further test of the rivet elements 3 can be provided. This is carried out here by a further testing unit 12. The further testing unit 12 can comprise an optical and/or mechanical sensor. Depending on the characteristic of the rivet elements 3 to be detected, the further testing unit 12 can be realized as the testing unit 11. However, it can also comprise a different design.

For example, the testing unit 12 can be provided for testing rivet elements 3, in particular rivet collars 3b and/or spacers. The rivet elements 3 can be pushed onto said testing unit for testing and/or the testing unit can be dipped in said rivet elements 3. Such a testing unit 12 has proved its worth in particular for testing screw collars and/or crimping collars. Using such a testing unit 12, closing grooves and/or closing threads can be detected and tested in particular by means of a pattern recognition.

Here, a testing unit 11, 12 carries out pattern recognition for recognizing and/or measuring features on the shank 3d of the rivet element 3. For example, the pattern recognition can detect and test closing grooves 3e and/or closing threads.

Here, the robot 6 transports the rivet elements 3, in particular individually, from the rivet delivery unit 4 to a testing unit 11, 12 or to the testing units 11, 12. The robot 6 can hold the rivet element 3 in a gripped manner during the test or the tests with the testing unit 11, 12 or the testing units 11, 12. The tests are carried out here sequentially. The rivet element 3 is also transported here between the testing units 11, 12 by the robot 6. Where applicable, it can be necessary for the robot 6 to deposit the rivet element 3 between two testing units 11, 12 and to re-grip it. This is sensible in particular when the gripper 7 of the robot 6, on account of the size of the rivet element 3, can only grip said rivet element such that variables to be measured are hidden when it is being gripped.

After testing in the testing unit 11, 12 or the testing units 11, 12, the rivet element 3 is supplied here to the rivet cartridge 2.

The method can be realized in a manner in such a way that all rivet elements 3 supplied to a rivet cartridge 2 have been tested for the predetermined characteristics that are relevant to the drilling process and/or the riveting process. However, at least 50%, further such as at least 80%, further at least 95% of all rivet elements 3 supplied to a rivet cartridge can be tested. In this respect, the method differs here from a batch-wise random test on rivet elements 3 at a rivet producer in that a significant number of rivet elements 3 are tested by the rivet loading station 1 for predetermined characteristics that are relevant to the drilling process and/or the riveting process prior to being supplied to the rivet cartridge 2. Faulty rivet elements 3 can be detected by the control unit 8 and the faults thereof reported. The faulty rivet elements 3 can be assigned to the secondary packaging from which they were removed. This enables comprehensive complaint management of rivet elements 3 with respect to the manufacturer of the rivet elements 3.

In addition to this or as an alternative to it, multiple rivet cartridge receiving means 5 with rivet cartridges 2 are provided, the detected or tested rivet elements 3 being supplied to a rivet cartridge 2 in dependence on the detected characteristics of a rivet element 3. Rivet elements 3 of the same type can be supplied to at least two of the multiple rivet cartridges 2. This is advantageous in particular for sorting the rivet elements 3 as described below.

Subcategories can be formed for sorting the rivet elements 3 of a type and a rivet cartridge 2 is assigned to said subcategories, in particular in each case. In addition to this or as an alternative to it, subcategories can be formed on the basis of the data regarding the rivet elements 3, in particular the specification of the rivet elements 3, and a rivet cartridge 2 can be assigned to said subcategories, in particular in each case. The rivet elements 3 can then be supplied to the rivet cartridge 2 assigned to said subcategory corresponding to their categorization into a subcategory in dependence on their test in the testing unit 11, 12.

The subcategories can be formed by tolerance ranges. In this way, batch sub-distribution of rivet elements 3 into the rivet cartridges 2 is possible. The rivet elements 3 can therefore be sorted in such a manner by the rivet loading station 1 that the rivet elements 3, in particular originating from secondary packaging, are sorted into various smaller tolerance ranges. Then only rivet elements 3 with a smaller tolerance range overall than the rivet elements 3 supplied to the rivet loading station 1 originally from secondary packaging are situated in the individual rivet cartridges 2 after sorting.

In this context, it has proved particularly worthwhile when data regarding the rivet elements 3 supplied to a rivet cartridge or rivet elements 3 to be supplied to a rivet cartridge 2 are linked. The data, in particular the specification and/or the subcategory can be linked to the rivet cartridge 2. In this case, this can be in particular a tolerance range. In addition to this or as an alternative to it, however, characteristics, in particular dimensions, of each individual rivet element and where applicable the sequence of the rivet elements 3 in the rivet cartridge 2 can also be linked with the rivet cartridge 2. The linking can occur, for example, as a result of said data being written on an RFID chip of the rivet cartridge 2. As a result, precise matching of the drilling and the riveting process to the rivet elements 3 provided for riveting is made possible.

On the basis of said data, one rivet element 3 from various rivet elements 3 of a type can be subsequently selected for placement into the bore after measuring a bore by a finishing facility 14 requesting a corresponding rivet element 3. In addition to this or as an alternative to it, the bore to be generated with the finishing facility 14 can be determined or adapted on the basis of a rivet element 3 to be placed—in particular on account of its categorization into a subcategory, for example the countersinking depth to be drilled can be determined or adapted in dependence on the dimensions of the rivet head. The linked data can be interrogated for this reason by the finishing facility 14.

The rivet cartridge receiving means 5 and/or the rivet cartridge 2 comprise here a pocket 5*a* into which the rivet elements 2 are deposited by the robot 6. Where applicable, the rivet cartridge 2 can also take over the rivet elements 2 directly from the robot 6.

The rivet elements 3 are conveyed into the rivet cartridge 2 here by means of a pressure difference, that is to say in particular by means of negative pressure and/or by means of compressed air into the rivet cartridge 2. In this case, the rivet elements 3 can be conveyed with the shank 3*d* or the head first into the rivet cartridge 2.

The rivet elements 3 are received by the rivet cartridge 2 here in an aligned manner, in particular in a positionally defined manner. This can be effected for example in the rivet cartridge 2 by an, in particular, wound hose in which the rivet elements 3 are received and by which the rivet elements 3 are guided. It has proved to be particularly worthwhile when the supply or removal of the rivet elements 3 into the rivet cartridge 2 or out of the rivet cartridge 2 is effected according to the first in-first out principle and/or according to the first in-last out principle. The sequence of the rivet elements 3 in the rivet cartridge 2 can not be modified within the rivet cartridge.

As proceeds from the above description and FIG. 1, the rivet delivery unit 4, where applicable the testing units 11, 12 and the rivet cartridge receiving means 5 with a rivet cartridge 2, where applicable received therein, are chained together, that is to say are arranged in particular spatially together. The rivet elements 3 can be supplied to the rivet cartridge 2 by an, in particular immovably mounted, robot 6 from the rivet delivery unit 4 where applicable above the testing units 11, 12. However, multiple robots 6 can also be provided, where applicable, for the transport.

Faulty rivet elements 3 can be supplied to a reject container 13*a*. This can be effected, for example, in a robot-based manner, in particular by means of the robot 6, or, however, should the faulty rivet elements 3 be effected in the gripping region 4*c*, good rivet elements 3 can be supplied by the robot 6 to the rivet cartridges 2 and, in particular when only faulty rivet elements 3 still remain in the gripping region, the rivet elements 3 remaining in the gripping region 4*c* are supplied from the rivet delivery unit 4, for example by means of wobbling movements, to a reject container 13*b*.

Figure 2:
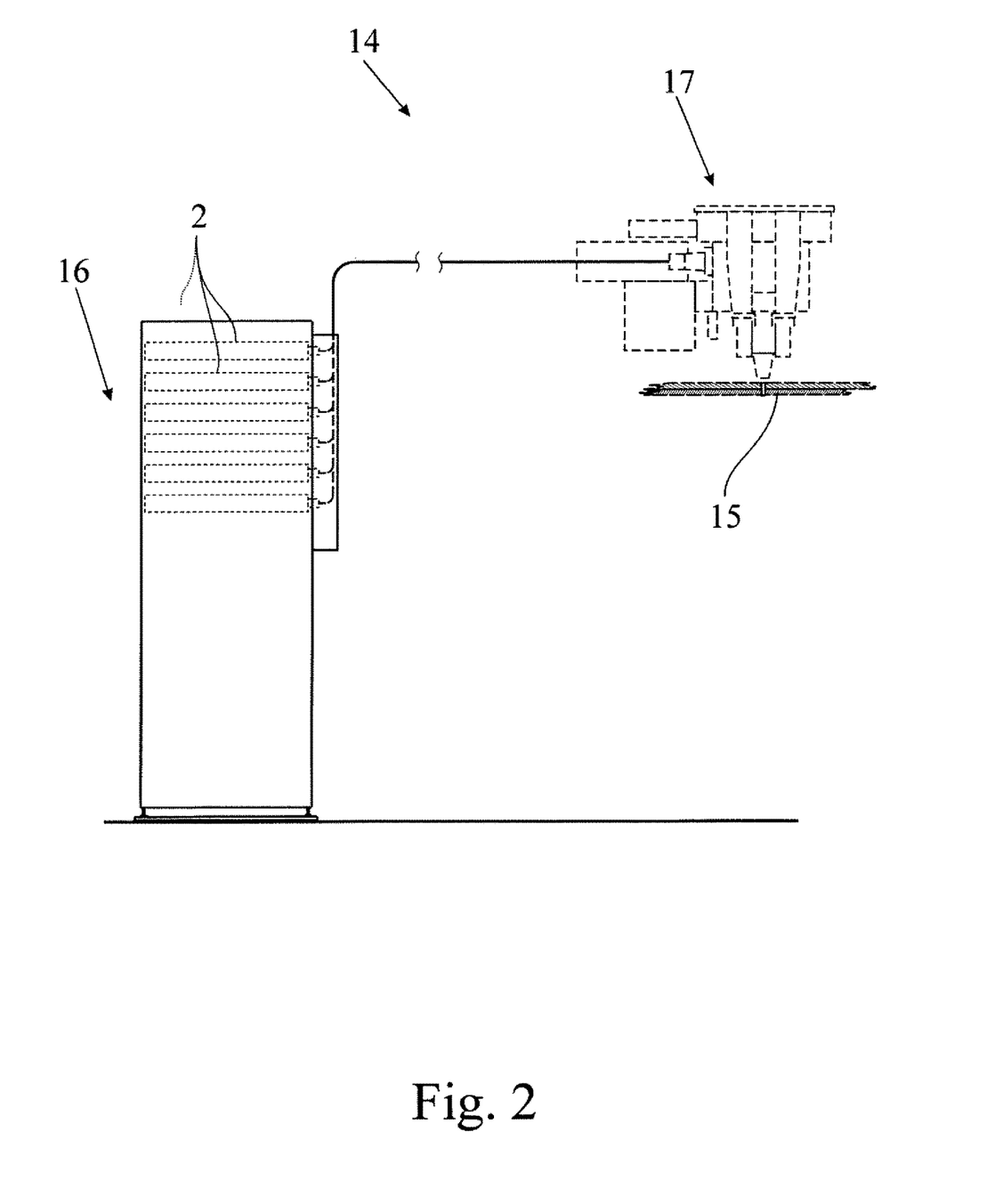
FIG. 2 shows a schematic representation of a production facility with a rivet storage unit and a drill/rivet tool and FIG. 3 shows rivet elements gripped by a gripper as an example.

FIG. 2 shows a schematic representation of the finishing facility 14 as proposed for producing a structural component 15. Once a rivet cartridge 2 has been filled using the previously described method, said rivet cartridge 2 can be inserted into a rivet storage unit 16. The finishing facility 14 comprises a drill-rivet tool 17 for drilling and riveting. On the basis of the data linked to the rivet cartridge 2, the finishing facility 14 can adapt the drilling process and/or the riveting process to the rivet element 3 to be affixed. In addition to this or as an alternative to it, a suitable rivet element 3 can be requested from the rivet storage unit 16 for an already drilled and where applicable measured hole.

In some embodiments, the drilling and/or the riveting is consequently performed on the basis of the predetermined characteristics of the rivet elements 3 that are relevant to the drilling operation and/or the riveting operation, detected prior to supplying the rivet elements 3 to the rivet cartridge 2, and/or, a suitable rivet element 3 for a bore 15*a* is requested from the rivet storage unit 16 and a rivet joint is produced on the basis of the predetermined characteristics of the rivet elements 3 that are relevant to the drilling operation and/or the riveting operation, detected prior to supplying the rivet elements 3 to the rivet cartridge 2.

Of particular importance for some embodiments, in this case, is in particular the measuring of the heads 3*c* of the rivet elements 3 and the adaptation of the bore 15*a*, in particular of the countersinking 15*b* on the head 3*c* of the rivet element 3 or the selection of a rivet element 3 with a suitable head 3*c* for a bore 15*a*, in particular the countersinking 15*b* of a bore 15*a*. According to some embodiments of the method, the rivet loading station 1 detects, for example, the rivet head diameter and/or the rivet head length prior to supplying the rivet element to the rivet cartridge as predetermined characteristics of the rivet elements 3 that are relevant to the drilling process and/or the riveting process and that the finishing facility determines and performs the bore on the basis of the rivet head diameter and/or the rivet head length, in particular determines and performs the countersinking depth for the bore.

Figure 3:
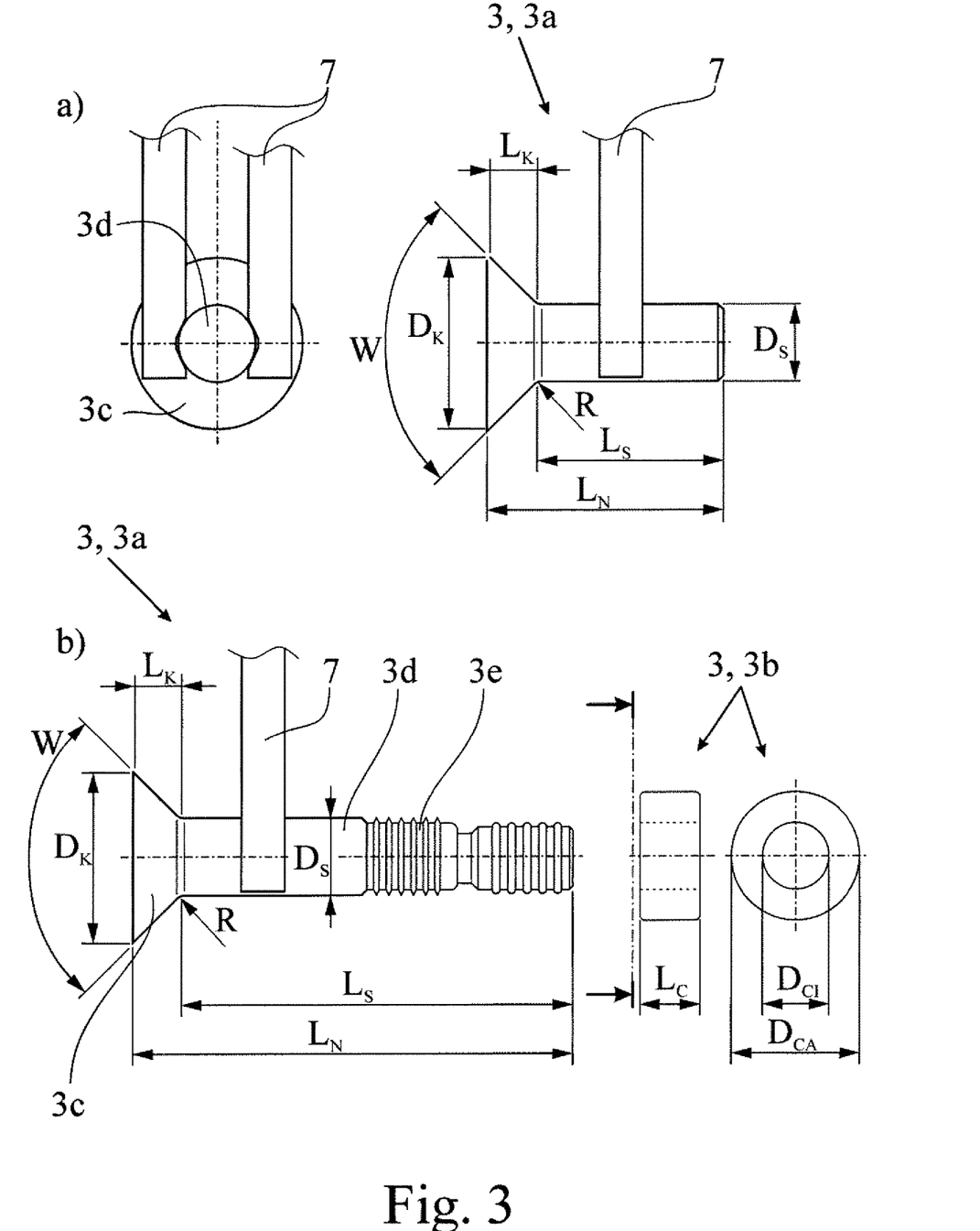

FIG. 3 shows finally as an example of the rivet elements 3 in a) a full rivet with a countersunk head, in b) a fitted rivet with a countersunk head and a rivet collar 3*b* which corresponds to the fitted rivet. Furthermore, many further rivet elements can also be supplied in the same way to rivet cartridges by way of the rivet loading station. These can also be, in particular, screw rivets and/or blind rivets.

For the rivet elements 3 shown in FIG. 3, possible relevant characteristics for the drilling process and/or the riveting process are shown as an example, a selection from said characteristics being able to depend in each case on the demands of the rivet joint to be generated. The relevant characteristics measured here can be the rivet length $L_N$ and/or the shank length $L_S$ and/or the head length $L_K$ and/or the head diameter $D_K$ and/or the shank diameter $D_S$. In addition, the countersunk head angle W and the transition radius R are marked as possible characteristics that are relevant to the drilling process and/or the riveting process. Furthermore, a rivet structure, namely the closing grooves 3*e* of the fitting rivet in FIG. 3*b*), is shown.

For the rivet collar 3*b*, the rivet collar length $L_C$ and the rivet collar inside diameter $D_{CI}$ and the rivet collar outside diameter $D_{CA}$ are shown here as characteristics that are relevant to the riveting process.

The invention claimed is:

1. A method for filling rivet cartridges with rivet elements by a rivet loading station, the rivet loading station having a rivet delivery unit and rivet cartridge receiving elements, the method comprising:
   delivering the rivet elements from the rivet delivery unit to the rivet cartridges in an aligned manner, wherein the rivet cartridges are received by the rivet cartridge receiving elements,
   detecting predetermined characteristics of the rivet elements that are relevant to a drilling process and/or a riveting process prior to supplying the rivet elements to the rivet cartridges, and
   supplying each rivet element to one of the rivet cartridges depending on the detected predetermined characteristics of the rivet element.

2. The method as claimed in claim 1, wherein the rivet loading station comprises a control unit which controls the rivet loading station, wherein the control unit detects the predetermined characteristics of the rivet elements that are relevant to the drilling process and/or the riveting process prior to supplying them to the rivet cartridge and wherein the control unit measures the characteristics with a sensor arrangement comprising a testing unit which is assigned to the sensor arrangement.

3. The method as claimed in claim 2, wherein the testing unit comprises a lighting unit for lighting a rivet element during the detecting of the predetermined characteristics that are relevant to the drilling process and/or the riveting process and lights a rivet element during the detecting process.

4. The method as claimed in claim 2, wherein the testing unit is realized as a system that is telecentric on both sides.

5. The method as claimed in claim 2, wherein the measuring tolerance of the testing unit is less than ±5 micrometers.

6. The method as claimed in claim 2, wherein the control unit comprises pattern recognition for recognizing and/or measuring features on a shank of the rivet element and detects a pattern on the shank of the rivet element with the sensor arrangement.

7. The method as claimed in claim 6, wherein the control unit detects and tests closing grooves and/or closing threads.

8. The method as claimed in claim 2, wherein rivet elements are supplied to the rivet delivery unit from a secondary packaging and wherein data regarding the rivet elements connected to the secondary packaging is detected by the control unit.

9. The method as claimed in claim 8, wherein the data includes specification of the rivet elements.

10. The method as claimed in claim 2, wherein subcategories are formed for a type of rivet elements and/or subcategories are formed on the basis of data regarding the rivet elements and wherein the subcategories have assigned thereto a rivet cartridge and wherein the rivet elements, in dependence on their test in the testing unit, are supplied corresponding to their categorization into a subcategory to the rivet cartridge assigned to the subcategory.

11. The method as claimed in claim 2, wherein the predetermined characteristics that are relevant to the drilling process and/or the riveting process are geometric characteristics of the rivet elements.

12. The method as claimed in claim 1, wherein the predetermined characteristics that are relevant to the drilling process and/or the riveting process are a rivet head diameter $D_K$ and/or a rivet head length $L_K$ and/or an angle W of a rivet countersunk head and/or a transition radius R.

13. The method as claimed in claim 1, wherein a testing unit for testing rivet elements dips into the rivet elements and/or the rivet elements are pushed onto the testing unit.

14. The method as claimed in claim 1, wherein the method is realized in such a manner that all rivet elements supplied to a rivet cartridge have been tested for the predetermined characteristics that are relevant to the drilling process and/or the riveting process.

15. The method as claimed in claim 1, wherein data regarding the rivet elements supplied in a rivet cartridge or to be supplied to the rivet cartridge is linked.

16. The method as claimed in claim 1, wherein rivet elements of the same type are supplied to at least two of the rivet cartridges.

17. A method for filling rivet cartridges with rivet elements by a rivet loading station, the rivet loading station having a rivet delivery unit and rivet cartridge receiving elements, the method comprising:
  delivering the rivet elements from the rivet delivery unit to the rivet cartridges in an aligned manner, wherein the rivet cartridges are received by the rivet cartridge receiving elements;
  detecting predetermined characteristics of the rivet elements that are relevant to a drilling process and/or a riveting process prior to supplying the rivet elements to the rivet cartridges; and
  supplying each rivet element to one of the rivet cartridges depending on the detected predetermined characteristics of the rivet element;
  wherein the rivet loading station comprises a control unit which controls the rivet loading station, wherein the control unit detects the predetermined characteristics of the rivet elements that are relevant to the drilling process and/or the riveting process prior to supplying them to the rivet cartridge and wherein the control unit measures the characteristics with a sensor arrangement comprising a testing unit which is assigned to the sensor arrangement; and
  wherein rivet elements are supplied to the rivet delivery unit from a secondary packaging and wherein data regarding the rivet elements connected to the secondary packaging is detected by the control unit.

18. A method for filling rivet cartridges with rivet elements by a rivet loading station, the rivet loading station having a rivet delivery unit and rivet cartridge receiving elements, the method comprising:
  delivering the rivet elements from the rivet delivery unit to the rivet cartridges in an aligned manner, wherein the rivet cartridges are received by the rivet cartridge receiving elements; and
  detecting predetermined characteristics of the rivet elements that are relevant to a drilling process and/or a riveting process prior to supplying the rivet elements to the rivet cartridges;
  wherein the rivet loading station comprises a control unit which controls the rivet loading station, wherein the control unit detects the detected predetermined characteristics of the rivet elements that are relevant to the drilling process and/or the riveting process prior to supplying them to the rivet cartridge and wherein the control unit measures the characteristics with a sensor arrangement comprising a testing unit which is assigned to the sensor arrangement; and
  wherein subcategories are formed for a type of rivet elements and/or subcategories are formed on the basis of data regarding the rivet elements and wherein the subcategories have assigned thereto a rivet cartridge and wherein the rivet elements, in dependence on their test in the testing unit, are supplied corresponding to their categorization into a subcategory to the rivet cartridge assigned to the subcategory.

* * * * *